United States Patent
Melzer et al.

(10) Patent No.: US 8,711,970 B2
(45) Date of Patent: Apr. 29, 2014

(54) PRECODING CODEBOOKS FOR MIMO COMMUNICATION SYSTEMS

(71) Applicant: Marvell World Trade Ltd., St. Michael (BB)

(72) Inventors: Ezer Melzer, Tel Aviv (IL); Yu-Ngok Li, Oakland, CA (US); Adoram Erell, Herzliya (IL); Daniel Yellin, Ra'anana (IL)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/760,088

(22) Filed: Feb. 6, 2013

(65) Prior Publication Data

US 2013/0148755 A1    Jun. 13, 2013

Related U.S. Application Data

(63) Continuation of application No. 12/652,044, filed on Jan. 5, 2010, now Pat. No. 8,391,392.

(60) Provisional application No. 61/142,507, filed on Jan. 5, 2009.

(51) Int. Cl.
*H04B 7/02*    (2006.01)

(52) U.S. Cl.
USPC ............................. 375/267; 375/295; 375/219

(58) Field of Classification Search
USPC ......................................... 375/260, 267, 221
See application file for complete search history.

(56) References Cited

U.S. PATENT DOCUMENTS

| | | | |
|---|---|---|---|
| 5,231,629 A | 7/1993 | Kotzin et al. | |
| 5,349,567 A | 9/1994 | Reed | |
| 5,940,439 A | 8/1999 | Kleider et al. | |
| 6,466,904 B1 | 10/2002 | Gao et al. | |
| 6,512,750 B1 | 1/2003 | Palenius | |

(Continued)

FOREIGN PATENT DOCUMENTS

| | | |
|---|---|---|
| EP | 2182754 A1 | 5/2010 |
| JP | 2008236222 A | 2/2008 |

(Continued)

OTHER PUBLICATIONS

3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.

(Continued)

*Primary Examiner* — Daniel Washburn
*Assistant Examiner* — Fitwi Hailegiorgis

(57) ABSTRACT

A method for communication includes configuring a communication system that includes a transmitter and a receiver with first precoding matrices for mapping up to N data streams onto N transmit antenna ports of the transmitter. Each of at least some of the first precoding matrices are derived from respective second and third precoding matrices. The second and third precoding matrices are configured for mapping data onto respective numbers of transmit antenna ports that are less than N. The data streams are mapped onto the N transmit antenna ports using a precoding scheme based on one of the first precoding matrices. The mapped data streams are transmitted over the N transmit antenna ports from the transmitter to the receiver.

19 Claims, 3 Drawing Sheets

(56) References Cited

U.S. PATENT DOCUMENTS

| | | | |
|---|---|---|---|
| 6,757,319 B1 | 6/2004 | Parsa et al. | |
| 6,865,237 B1 | 3/2005 | Boariu et al. | |
| 7,839,944 B2* | 11/2010 | Lee et al. | 375/267 |
| 7,941,186 B2 | 5/2011 | Cho et al. | |
| 8,036,286 B2 | 10/2011 | Lee et al. | |
| 8,068,555 B2 | 11/2011 | Jongren et al. | |
| 8,098,750 B2* | 1/2012 | Mueck et al. | 375/260 |
| 8,179,775 B2 | 5/2012 | Chen et al. | |
| 8,325,844 B2 | 12/2012 | Walton et al. | |
| 2003/0035491 A1 | 2/2003 | Walton et al. | |
| 2005/0141630 A1 | 6/2005 | Catreux et al. | |
| 2005/0157810 A1 | 7/2005 | Raleigh et al. | |
| 2005/0237920 A1 | 10/2005 | Howard et al. | |
| 2005/0250544 A1 | 11/2005 | Grant et al. | |
| 2006/0014554 A1 | 1/2006 | Gerlach | |
| 2006/0056538 A1 | 3/2006 | Nam et al. | |
| 2006/0093060 A1 | 5/2006 | Jung et al. | |
| 2006/0114858 A1 | 6/2006 | Walton et al. | |
| 2006/0153112 A1 | 7/2006 | Lim et al. | |
| 2006/0203777 A1 | 9/2006 | Kim et al. | |
| 2006/0233131 A1 | 10/2006 | Gore et al. | |
| 2006/0276212 A1 | 12/2006 | Sampath et al. | |
| 2007/0058746 A1 | 3/2007 | Gueguen | |
| 2007/0076810 A1 | 4/2007 | Herrera et al. | |
| 2007/0099578 A1 | 5/2007 | Adeney et al. | |
| 2007/0149229 A1 | 6/2007 | Frederiksen et al. | |
| 2007/0153731 A1 | 7/2007 | Fine | |
| 2007/0160162 A1 | 7/2007 | Kim et al. | |
| 2007/0165738 A1 | 7/2007 | Barriac et al. | |
| 2007/0217540 A1 | 9/2007 | Onggosanusi et al. | |
| 2007/0223422 A1 | 9/2007 | Kim et al. | |
| 2007/0223423 A1 | 9/2007 | Kim et al. | |
| 2007/0230373 A1 | 10/2007 | Li et al. | |
| 2007/0248068 A1 | 10/2007 | Onggosanusi et al. | |
| 2007/0253386 A1 | 11/2007 | Li et al. | |
| 2007/0270170 A1 | 11/2007 | Yoon et al. | |
| 2008/0013610 A1* | 1/2008 | Varadarajan et al. | 375/221 |
| 2008/0025336 A1 | 1/2008 | Cho et al. | |
| 2008/0039067 A1 | 2/2008 | Jin et al. | |
| 2008/0043702 A1 | 2/2008 | Moon et al. | |
| 2008/0080364 A1 | 4/2008 | Barak et al. | |
| 2008/0080632 A1 | 4/2008 | Kim et al. | |
| 2008/0080634 A1 | 4/2008 | Kotecha et al. | |
| 2008/0080635 A1 | 4/2008 | Hugl et al. | |
| 2008/0080637 A1 | 4/2008 | Khan et al. | |
| 2008/0095258 A1 | 4/2008 | She et al. | |
| 2008/0101407 A1 | 5/2008 | Khan et al. | |
| 2008/0108310 A1 | 5/2008 | Tong et al. | |
| 2008/0112351 A1 | 5/2008 | Surineni et al. | |
| 2008/0130778 A1 | 6/2008 | Xia et al. | |
| 2008/0144522 A1 | 6/2008 | Chang et al. | |
| 2008/0165875 A1 | 7/2008 | Mundarath et al. | |
| 2008/0186212 A1 | 8/2008 | Clerckx et al. | |
| 2008/0192852 A1 | 8/2008 | Kent et al. | |
| 2008/0198776 A1 | 8/2008 | Seo | |
| 2008/0232494 A1 | 9/2008 | Pan et al. | |
| 2008/0232503 A1* | 9/2008 | Kim | 375/267 |
| 2008/0247364 A1 | 10/2008 | Kim et al. | |
| 2008/0247475 A1 | 10/2008 | Kim et al. | |
| 2008/0268855 A1 | 10/2008 | Hanuni et al. | |
| 2008/0268887 A1 | 10/2008 | Jansen et al. | |
| 2008/0285433 A1 | 11/2008 | Akita et al. | |
| 2008/0292013 A1 | 11/2008 | Varadarajan et al. | |
| 2008/0298452 A1 | 12/2008 | Sampath et al. | |
| 2008/0298482 A1 | 12/2008 | Rensburg et al. | |
| 2008/0318606 A1 | 12/2008 | Tsutsui et al. | |
| 2009/0011761 A1 | 1/2009 | Han et al. | |
| 2009/0016263 A1 | 1/2009 | Kishigami et al. | |
| 2009/0046800 A1 | 2/2009 | Xu et al. | |
| 2009/0098876 A1 | 4/2009 | Khan et al. | |
| 2009/0110114 A1 | 4/2009 | Onggosanusi et al. | |
| 2009/0122857 A1 | 5/2009 | Li et al. | |
| 2009/0161605 A1 | 6/2009 | Shen et al. | |
| 2009/0180561 A1 | 7/2009 | Kim et al. | |
| 2009/0252332 A1 | 10/2009 | Chang et al. | |
| 2009/0252333 A1 | 10/2009 | Chang et al. | |
| 2009/0282310 A1 | 11/2009 | Seok et al. | |
| 2009/0296844 A1 | 12/2009 | Ihm et al. | |
| 2009/0304109 A1 | 12/2009 | Kotecha | |
| 2010/0031117 A1 | 2/2010 | Lee et al. | |
| 2010/0034308 A1 | 2/2010 | Kim et al. | |
| 2010/0035627 A1 | 2/2010 | Hou et al. | |
| 2010/0054354 A1 | 3/2010 | Tosato | |
| 2010/0056170 A1 | 3/2010 | Lindoff et al. | |
| 2010/0061477 A1 | 3/2010 | Lee et al. | |
| 2010/0067512 A1 | 3/2010 | Nam et al. | |
| 2010/0069106 A1 | 3/2010 | Swarts et al. | |
| 2010/0074301 A1 | 3/2010 | Howard et al. | |
| 2010/0103834 A1 | 4/2010 | Gorokhov et al. | |
| 2010/0158151 A1 | 6/2010 | Krauss et al. | |
| 2010/0172424 A1 | 7/2010 | Perets et al. | |
| 2010/0172430 A1 | 7/2010 | Melzer et al. | |
| 2010/0173639 A1 | 7/2010 | Li et al. | |
| 2010/0215112 A1 | 8/2010 | Tsai et al. | |
| 2010/0220800 A1 | 9/2010 | Erell et al. | |
| 2010/0238984 A1 | 9/2010 | Sayana et al. | |
| 2010/0254474 A1 | 10/2010 | Gomadam et al. | |
| 2010/0260234 A1 | 10/2010 | Thomas et al. | |
| 2010/0260243 A1 | 10/2010 | Ihm et al. | |
| 2010/0267341 A1 | 10/2010 | Bergel et al. | |
| 2010/0271968 A1 | 10/2010 | Liu et al. | |
| 2010/0272014 A1 | 10/2010 | Orlik et al. | |
| 2010/0272032 A1 | 10/2010 | Sayana et al. | |
| 2010/0273514 A1 | 10/2010 | Koo et al. | |
| 2010/0278278 A1 | 11/2010 | Lee et al. | |
| 2010/0284484 A1 | 11/2010 | Jongren et al. | |
| 2010/0290548 A1 | 11/2010 | Hoshno et al. | |
| 2010/0296603 A1 | 11/2010 | Lee et al. | |
| 2011/0019631 A1 | 1/2011 | Kotecha et al. | |
| 2011/0026413 A1 | 2/2011 | Swarts et al. | |
| 2011/0034175 A1 | 2/2011 | Fong et al. | |
| 2011/0058621 A1 | 3/2011 | Clerckx et al. | |
| 2011/0064156 A1 | 3/2011 | Kim et al. | |
| 2011/0077038 A1 | 3/2011 | Montojo et al. | |
| 2011/0080969 A1 | 4/2011 | Jongren et al. | |
| 2011/0085610 A1 | 4/2011 | Zhuang et al. | |
| 2011/0096704 A1 | 4/2011 | Erell et al. | |
| 2011/0103534 A1 | 5/2011 | Axmon et al. | |
| 2011/0110403 A1 | 5/2011 | Jongren | |
| 2011/0110450 A1 | 5/2011 | Gomadam et al. | |
| 2011/0150052 A1 | 6/2011 | Erell et al. | |
| 2011/0164701 A1 | 7/2011 | Nikopourdeilami et al. | |
| 2011/0170435 A1 | 7/2011 | Kim et al. | |
| 2011/0170638 A1 | 7/2011 | Yuan et al. | |
| 2011/0188393 A1 | 8/2011 | Mallik et al. | |
| 2011/0194594 A1 | 8/2011 | Noh et al. | |
| 2011/0194638 A1 | 8/2011 | Erell et al. | |
| 2011/0194644 A1 | 8/2011 | Liu et al. | |
| 2011/0205930 A1 | 8/2011 | Rahman et al. | |
| 2011/0216846 A1 | 9/2011 | Lee et al. | |
| 2011/0235608 A1 | 9/2011 | Koo et al. | |
| 2011/0250919 A1 | 10/2011 | Barbieri et al. | |
| 2011/0268204 A1 | 11/2011 | Choi et al. | |
| 2011/0274188 A1 | 11/2011 | Sayana et al. | |
| 2011/0306341 A1 | 12/2011 | Klein et al. | |
| 2012/0002568 A1 | 1/2012 | Tiirola et al. | |
| 2012/0020433 A1 | 1/2012 | Bhattad et al. | |
| 2012/0033592 A1 | 2/2012 | Kim et al. | |
| 2012/0058735 A1 | 3/2012 | Vermani et al. | |
| 2012/0063336 A1 | 3/2012 | Shany et al. | |
| 2012/0069887 A1 | 3/2012 | Park et al. | |
| 2012/0069917 A1 | 3/2012 | Liu et al. | |
| 2012/0087425 A1 | 4/2012 | Gomadam et al. | |
| 2012/0087435 A1 | 4/2012 | Gomadam et al. | |
| 2012/0134434 A1 | 5/2012 | Chen et al. | |
| 2012/0219042 A1 | 8/2012 | Onggosanusi et al. | |
| 2012/0219083 A1 | 8/2012 | Tong et al. | |
| 2012/0250550 A1 | 10/2012 | Gomadam et al. | |
| 2012/0257664 A1 | 10/2012 | Yue et al. | |
| 2012/0275376 A1 | 11/2012 | Sampath et al. | |
| 2012/0275386 A1 | 11/2012 | Frenne et al. | |
| 2012/0281620 A1 | 11/2012 | Sampath et al. | |
| 2013/0028068 A1 | 1/2013 | Park et al. | |
| 2013/0028344 A1 | 1/2013 | Chen et al. | |

(56) References Cited

U.S. PATENT DOCUMENTS

| | | | |
|---|---|---|---|
| 2013/0039284 A1 | 2/2013 | Marinier et al. |
| 2013/0051256 A1 | 2/2013 | Ong et al. |
| 2013/0107916 A1 | 5/2013 | Liu et al. |
| 2013/0176991 A1 | 7/2013 | Yi |
| 2013/0182786 A1 | 7/2013 | Frenne et al. |

FOREIGN PATENT DOCUMENTS

| | | | |
|---|---|---|---|
| JP | 2008054125 A | 3/2008 |
| JP | 2008118411 A | 5/2008 |
| JP | 2008147792 A | 6/2008 |
| WO | 2005117283 A2 | 12/2005 |
| WO | 2007133564 A3 | 11/2007 |
| WO | 2008009157 A1 | 1/2008 |
| WO | 2008133582 A2 | 11/2008 |
| WO | 2010013950 A2 | 2/2010 |
| WO | 2011147692 A1 | 12/2011 |

OTHER PUBLICATIONS

Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
Ntt Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
Erell, A.,U.S. Appl. No. 13/052,075, filed on Mar. 20, 2011.

Marvell, "Codebook Adaptation for ULA Antenna", 3GPP TSG RAN WG1 Meeting #60, San Francisco, USA, Feb. 22-22, 2010.
U.S. Appl. No. 61/321,386, filed on Apr. 6, 2010.
U.S. Appl. No. 61/294,737, filed on Mar. 13, 2010.
Perets et al., U.S. Appl. No. 12/902,168, filed on Oct. 12, 2010.
Mayrench et al., U.S. Appl. No. 12/903,237, filed on Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE-A downlink transmission", 3GPP TSG RAN WG1 Meeting #59, Jeju, Korea, Nov. 9-13, 2009.
Marvell, "Details of PUCCH 1-1 for 8Tx", 3GPP TSG RAN # 63, Jacksonville, USA, Nov. 15-19, 2010.
Gomadam et al., U.S. Appl. No. 13/346,737, filed on Jan. 10, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSG RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (Ntt Docomo), "Text Proposal for RAN1 TR on LTE Advanced", 3GPP TSG RAN WG1 Meeting #53bis, Warsaw, Poland, Jun. 30-Jul. 4, 2008.
Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Re1.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WGI #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
International Application No. PCT/IB2009/052726 Search Report dated Jan. 28, 2010.
International Application No. PCT/IB2010/050014 Search Report dated Jun. 15, 2010.

(56) References Cited

OTHER PUBLICATIONS

International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4x2 and 4x4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, 3rd Generation Partnership Project; Technical Specification Group Radio Access Network; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16-2001, IEEE Computer Society and IEE Microwave Theory and Techniques Society, USA, Oct. 1, 2004.
Ntt Docomo et al., "Prioritized Deployment Scenarios for LTE-Advanced Studies", 3GPP TSG RAN WG4 Meeting #50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8x8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.
3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.
ETSI TS 136213, "LTE; Evolved Universal Terrestrial Radio Access (E-UTRA), Physical Layer Procedures", V10.2.0, Jun. 2011.
3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.
Alcatel-Lucent, "CQI and CSI Feedback Compression", 3GPP TSG RAN WG1 #54bis, Prague, Czech Republic, Sep. 29-Oct. 3, 2008.
Huawei, "DL MIMO Codebook", 3GPP TSG RAN WG1 Meeting #56bis, Seoul, South Korea, Mar. 23-27, 2009.
Huawei, "Adaptive Codebook Designs for MU-MIMO", 3GPP TSG RAN WG1 Meeting #56bis, Seoul, South Korea, Mar. 23-27, 2009.
Motorola, "On UE Feedback to Support LTE-A MU-MIMO and CoMP Operations", TSG-RAN WG1 #56bis, Seoul, South Korea, Mar. 23-27, 2009.
Huawei, "Adaptive Codebook Designs for DL MIMO", 3GPP TSG RAN WG1 Meeting #57, San Francisco, CA USA, May 3-8, 2009.
Ericsson, "On CSI feedback for ITU Requirement Fulfilling CoMP Schemes", TSG-RAN WG1 #57, San Francisco, USA, May 4-8, 2009.
Motorola, "Spatial Correlation Feedback to Support LTE-A MU-MIMO and CoMP: System Operation and Performance Results", TSG-RAN WG1 #57, San Francisco, USA, May 4-8, 2009.
Xia et al., "Design and Analysis of Transmit—Beamforming based on Limited-Rate Feedback", IEEE Transactions on signal processing (Draft), Minneapolis, MN, Mar. 16, 2005.
Huawei, "The Impact of CA on Mobility in LTE-A", 3GPP TSG RAN WG1 Meeting #56, Athens, Greece, Feb. 9-13, 2009.
U.S. Appl. No. 61/111,475, filed on Nov. 5, 2008.
Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).
Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).
3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.
Nokia Siemens Networks, "Autonomous Component Carrier Selection for LTE Advanced", 3GPP TSG RAN WG1 Meeting #54, Jeju Island, Korea, Aug. 18-22, 2008 (R1-083103).
Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).
Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).
Qualcomm Europe, "Notion of Anchor Carrier in LTE-A", 3GPP TSG RAN WG1 Meeting #55-bis, Ljubljana, Slovenia, Jan. 12-16, 2009 (R1-080356).
Samsung, "UL Transmission Power Control in LTE-A", 3GPP TSG RAN WG1 Meeting #56bis, Seoul, Korea, Mar. 23-27, 2009 (R1-091250).
International Application PCT/IB2010/055763 Search Report dated Jun. 14, 2011.
International Application PCT/IB2011/050015 Search Report dated Jul. 5, 2011.
Marvell, "Downlink MIMO with Coordinated Beamforming and Scheduling", 3GPP TSG RAN WG1 59, Jeju, South Korea, Nov. 9-14, 2009.
Texas Instruments, "Views and Simulation Results on 4Tx Codebook Enhancement", 3GPP TSG RAN WG1 62, Madrid, Spain, Aug. 23-27, 2010.
Texas Instruments, "Higher CSI feedback accuracy for 4/8Tx Rel.10 DL MIMO", 3GPP TSG RAN WG1 62, Madrid, Spain, Aug. 23-27, 2010.
U.S. Appl. No. 12/253,078, Office Action dated May 23, 2013.
U.S. Appl. No. 12/477,152, Official Action dated Jun. 26, 2012.
U.S. Appl. No. 12/723,645, Official Action dated Aug. 31, 2012.
U.S. Appl. No. 12/723,647, Official Action dated Aug. 17, 2012.
U.S. Appl. No. 12/652,044, Official Action dated Jun. 29, 2012.
U.S. Appl. No. 12/838,509, Official Action dated Jun. 21, 2012.

(56) References Cited

OTHER PUBLICATIONS

U.S. Appl. No. 13/023,555, Official Action dated Sep. 14, 2012.
International Application PCT/IB2012/051511 Search Report dated Aug. 31, 2012.
Gomadam et al., U.S. Appl. No. 13/610,904, filed on Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
JP Patent Application # 2011-544111 Official Action dated Nov. 6, 2012.
Zhang et al., U.S. Appl. No. 13/672,727, filed on Nov. 9, 2012.
Gomadam, K.S., U.S. Appl. No. 13/669,476, filed on Nov. 6, 2012.
Alcatel-Lucent et al., "Way Forward on Enhancement for Re1.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
Zte, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647, Official Action dated Feb. 6, 2012.
U.S. Appl. No. 12/723,647, Official Action dated Apr. 27, 2012.
Zhang et al., U.S. Appl. No. 13/409,130, filed on Mar. 1, 2012.
U.S. Appl. No. 12/652,044, Official Action dated Feb. 7, 2012.
Alcatel-Lucent et al., "Way Forward on 8Tx Codebook for Re1.10 DL MIMO", 3GPP TSG RAN WG1 62, Madrid, Spain, Aug. 23-27, 2010.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subspace-Based Channel Quantization for Distributed Cooperative Antenna Systems with Temporarily Correlated Channels", EURASIP Journal on Advances in Signal Processing, vol. 2008, Nov. 23, 2007.
Ntt Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
Gomadam et al., U.S. Appl. No. 13/736,959, filed Jan. 9, 2013.
3GPP TS 36.213, "3rd Generation Partnership Project; Technical Specification Group Radio Access Network; Evolved Universal Terrestrial Radio Access (E-UTRA); Physical layer procedures (Release 10)", version 10.3.0., Sep. 2011.
U.S. Appl. No. 12/965,878, Official Action dated Apr. 1, 2013.
U.S. Appl. No. 13/023,555, Office Action dated Feb. 5, 2013.
International Application PCT/IB2012/056181 Search Report dated Mar. 4, 2013.
International Application PCT/IB2012/056289 Search Report dated Mar. 26, 2013.
International Application PCT/IB2012/056182 Search Report dated Feb. 26, 2013.
Japanese Patent Application # 2011024295 Office Action dated Jan. 15, 2013.
Gomadam, K.S., U.S. Appl. No. 13/669,477, filed Nov. 6, 2012.
Gomadam et al., U.S. Appl. No. 13/862,422, filed Apr. 14, 2013.
U.S. Appl. No. 13/252,218, Office Action dated Apr. 11, 2013.
Japanese Patent Application # 2011-544111 Office Action dated Mar. 12, 2013.
Zte, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/902,168, Office Action dated Aug. 5, 2013.
U.S. Appl. No. 12/983,898, Office Action dated Sep. 12, 2013.
U.S. Appl. No. 13/052,075, Office Action dated Jul. 15, 2013.
U.S. Appl. No. 13/766,790, Office Action dated Jul. 22, 2013.
U.S. Appl. No. 12/903,237, Office Action dated Aug. 16, 2013.
International Application PCT/IB2013/052963 Search Report dated Sep. 27, 2013.
U.S. Appl. No. 13/543,835 Office Action dated Nov. 22, 2013.
U.S. Appl. No. 12/965,878 Notice of Allowance dated Feb. 10, 2014.
U.S. Appl. No. 12/965,878 Office Action dated Oct. 24, 2013.
U.S. Appl. No. 13/052,075 Notice of Allowance dated Nov. 8, 2013.
JP Patent Application # 2011-551560 Office Action dated Oct. 29, 2013.
JP Patent Application # 2012-506601 Office Action dated Oct. 22, 2013.

* cited by examiner

FIG. 2

$$A \otimes B = \begin{bmatrix} a_{11}B & \cdots & a_{1n}B \\ \vdots & \ddots & \vdots \\ a_{n1}B & \cdots & a_{nn}B \end{bmatrix}$$

$$A \in CB_n^{(n)}, B \in CB_p^{(p)} \Rightarrow$$

$$\begin{bmatrix}
a_{11}b_{11} & a_{11}b_{12} & \cdots & a_{11}b_{1p} & \cdots & \cdots & a_{1n}b_{11} & a_{1n}b_{12} & \cdots & a_{1n}b_{1p} \\
a_{11}b_{21} & a_{11}b_{22} & \cdots & a_{11}b_{2p} & \cdots & \cdots & a_{1n}b_{21} & a_{1n}b_{22} & \cdots & a_{1n}b_{2p} \\
\vdots & \vdots & \ddots & \vdots & & & \vdots & \vdots & \ddots & \vdots \\
a_{11}b_{p1} & a_{11}b_{p2} & \cdots & a_{11}b_{pp} & \cdots & \cdots & a_{1n}b_{p1} & a_{1n}b_{p2} & \cdots & a_{1n}b_{pp} \\
\vdots & \vdots & & \vdots & \ddots & & \vdots & \vdots & & \vdots \\
\vdots & \vdots & & \vdots & & \ddots & \vdots & \vdots & & \vdots \\
a_{n1}b_{11} & a_{n1}b_{12} & \cdots & a_{n1}b_{1p} & \cdots & \cdots & a_{nn}b_{11} & a_{nn}b_{12} & \cdots & a_{nn}b_{1p} \\
a_{n1}b_{21} & a_{n1}b_{22} & \cdots & a_{n1}b_{2p} & \cdots & \cdots & a_{nn}b_{21} & a_{nn}b_{22} & \cdots & a_{nn}b_{2p} \\
\vdots & \vdots & \ddots & \vdots & & & \vdots & \vdots & \ddots & \vdots \\
a_{n1}b_{p1} & a_{n1}b_{p2} & \cdots & a_{n1}b_{pp} & \cdots & \cdots & a_{nn}b_{p1} & a_{nn}b_{p2} & \cdots & a_{nn}b_{pp}
\end{bmatrix} \in CB_{np}^{(np)}$$

PRECODING CODEBOOKS FOR MIMO COMMUNICATION SYSTEMS

CROSS-REFERENCE TO RELATED APPLICATIONS

This application is a continuation of U.S. patent application Ser. No. 12/652,044, filed Jan. 5, 2010, which claims the benefit of U.S. Provisional Patent Application 61/142,507, filed Jan. 5, 2009. The disclosures of these related applications are incorporated herein by reference.

FIELD OF THE DISCLOSURE

The present disclosure relates generally to communication systems, and particularly to methods and systems for communication using multiple antennas.

BACKGROUND

Some communication systems transmit data from a transmitter to a receiver over multiple communication channels, using multiple transmit antennas and multiple receive antennas. Multiple-channel transmission is used, for example, in spatial multiplexing schemes that achieve high throughput, in beam-forming schemes that achieve high antenna directivity and in spatial diversity schemes that achieve high resilience against channel fading and multipath. These schemes are often referred to collectively as Multiple-Input Multiple-Output (MIMO) schemes.

MIMO schemes are contemplated, for example, for use in Evolved Universal Terrestrial Radio Access (E-UTRA) systems, also referred to as Long Term Evolution (LTE) systems. The Third Generation Partnership Project (3GPP) E-UTRA standards specify MIMO schemes for use by E-UTRA User Equipment (UE) and base stations (eNodeB). These schemes are described, for example, in 3GPP Technical Specification 36.211, entitled "Technical Specification Group Radio Access Network; Evolved Universal Terrestrial Radio Access (E-UTRA); Physical Channels and Modulation (Release 8)," (3GPP TS 36.211), version 8.6.0, March, 2009, which is incorporated herein by reference. In particular, section 6.3.4 of this specification defines precoding schemes that map data streams (also referred to as spatial layers) onto up to four transmit antenna ports. The 3GPP is currently in the process of specifying an extension of the E-UTRA specification, which is referred to as LTE-Advanced (LTE-A). The evolving LTE specifications contemplate the use of up to eight transmit antenna ports.

The description above is presented as a general overview of related art in this field and should not be construed as an admission that any of the information it contains constitutes prior art against the present patent application.

SUMMARY

An embodiment that is described herein provides a method for communication. The method includes configuring a communication system, which includes a transmitter and a receiver, with first precoding matrices for mapping up to N data streams onto N transmit antenna ports of the transmitter. Each of at least some of the first precoding matrices are derived from respective second and third precoding matrices. The second and third precoding matrices are configured for mapping data onto respective numbers of transmit antenna ports that are less than N. The data streams are mapped onto the N transmit antenna ports using a precoding scheme based on one of the first precoding matrices. The mapped data streams are transmitted over the N transmit antenna ports from the transmitter to the receiver.

In some embodiments, configuring the communication system includes producing a given first precoding matrix by computing a Kronecker product between a respective second precoding matrix, selected from among the second precoding matrices and a respective third precoding matrix selected from among the third precoding matrices.

In an embodiment, the first precoding matrices map R1 data streams onto the N antenna ports, R1≤N, and configuring the communication system includes defining a set of the precoding matrices for mapping r data streams onto the N transmit antenna ports, r<R1, each precoding matrix in the set including a subset of columns of a given matrix selected from the first precoding matrices. In a disclosed embodiment, defining the set includes including a candidate precoding matrix in the set responsively to verifying that the candidate precoding matrix cannot be expressed as a weighted permutation of the columns of another precoding matrix in the set. In an embodiment, a candidate precoding matrix is included in the set responsively to verifying that respective distances between the candidate precoding matrix and the other precoding matrices in the set, measured in accordance with a given distance metric, exceed a given threshold. In another embodiment, defining the set includes selecting the precoding matrices in the set to match a geometrical configuration of transmit antennas of the transmitter. In an embodiment, selecting the precoding matrices in the set includes choosing the precoding matrices in the set to match an array of cross-polarized transmit antennas. In yet another embodiment, mapping the data streams includes mapping the r data streams onto the N transmit antenna ports using one of the precoding matrices in the set.

In yet another embodiment, configuring the communication system includes storing in the communication system only the second and third precoding matrices, and computing the one of the first precoding matrices in the transmitter based on the stored second and third precoding matrices. In still another embodiment, transmitting the mapped data streams includes transmitting a signal conforming to a Long Term Evolution Advanced (LTE-A) specification. In an embodiment, mapping the data streams includes selecting the precoding scheme based on feedback from the receiver. In a disclosed embodiment, N=8. In an embodiment, the second precoding matrices are defined for mapping onto two antenna ports, and the third precoding matrices are defined for mapping onto four antenna ports. In an alternative embodiment, the second precoding matrices are defined for mapping onto four antenna ports, and the third precoding matrices are defined for mapping onto two antenna ports.

There is additionally provided, in accordance with an embodiment that is described herein, a communication apparatus that includes N transmit antenna ports and a transmitter. The transmitter is configured to accept a definition of first precoding matrices for mapping up to N data streams onto N transmit antenna ports, each of at least some of the first precoding matrices derived from respective second and third precoding matrices configured for mapping data onto respective numbers of transmit antenna ports that are less than N, to map the data streams onto the N transmit antenna ports using a precoding scheme based on one of the first precoding matrices, and to transmit the mapped data streams over the N transmit antenna ports to a receiver.

There is also provided, in accordance with an embodiment that is described herein, a mobile communication terminal that includes the disclosed communication apparatus. There is further provided, in accordance with an embodiment that is described herein, a chipset for processing signals in a mobile communication terminal, including the disclosed communication apparatus.

The present disclosure will be more fully understood from the following detailed description of the embodiments thereof, taken together with the drawings in which:

BRIEF DESCRIPTION OF THE DRAWINGS

FIG. 2 is a diagram showing a precoding matrix defined as a Kronecker product between two lower-dimension precoding matrices, in accordance with an embodiment of the present disclosure;

DETAILED DESCRIPTION OF EMBODIMENTS

Figure 1:
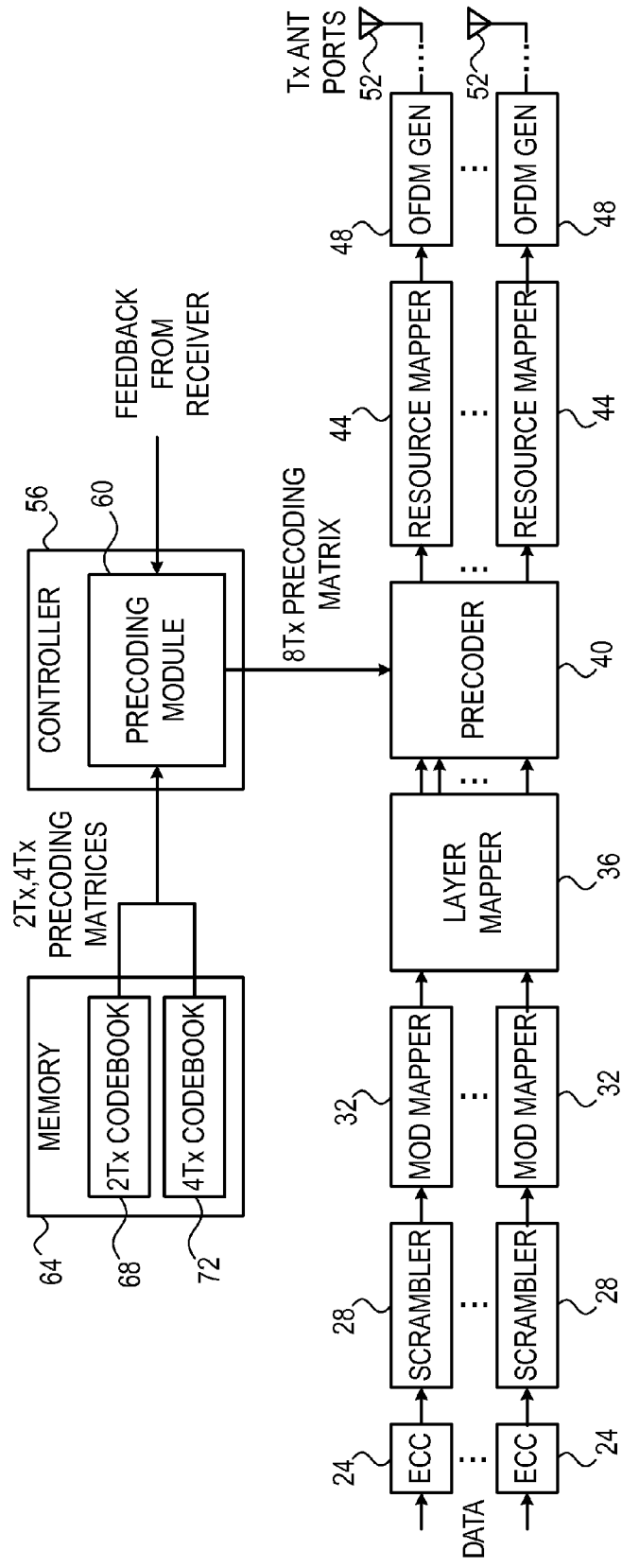
FIG. 1 is a block diagram that schematically illustrates a transmitter having multiple antennas, in accordance with an embodiment of the present disclosure.

In some MIMO schemes, a transmitter maps streams of modulated symbols onto spatial layers, i.e., signals that are to be transmitted over different MIMO transmission channels. The spatial layers are also referred to as transmission layers or spatial streams, or simply data streams for brevity. The transmitter then applies a precoding operation to map each spatial layer onto a respective set of antenna ports. The precoding operation is typically expressed by a precoding matrix, which defines the linear combination of spatial layers that is mapped onto each antenna port. Some MIMO systems use a pre-defined set of precoding matrices, referred to as a codebook, which is known to the transmitter and the receiver. A transmission process of this sort, as performed in the downlink of an E-UTRA eNodeB, is described in detail in section 6.3 of the 3GPP TS 36.211 specification, cited above. The description below follows the convention used in this 3GPP specification, in which the precoding is specified by a matrix whose number of rows is equal to the number of antenna ports, and whose number of columns is equal to the number of spatial streams.

Embodiments that are described herein provide improved methods and systems for precoding in MIMO systems. The disclosed techniques configure a communication system that includes a transmitter and a receiver with a set of precoding matrices for mapping up to N data streams onto N transmit antenna ports. This set of precoding matrices is derived from sets of precoding matrices that are defined for numbers of transmit antenna ports smaller than N. For example, the disclosed methods can be used to generate a codebook for eight transmit antenna ports from a codebook defined for two antenna ports and a codebook defined for four antenna ports.

In some embodiments, a given precoding matrix is produced by computing a Kronecker product (also known as a direct product or a tensor product) between matrices selected from the codebooks defined for the smaller numbers of antenna ports. This technique produces codebooks whose precoding matrices have a number of desirable properties, which are described in detail below. Several techniques for generating sub-codebooks (SCBs) for mapping different numbers of data streams onto the N antenna ports are also described.

The disclosed techniques produce high-performance precoding matrices with relatively small computational complexity. In addition, these methods and systems provide straightforward backward compatibility to smaller numbers of antenna ports. In some embodiments, the codebook is computed in advance and provided to the transmitter. In alternative embodiments, the transmitter stores only the precoding matrices defined for the smaller numbers of antenna ports, and computes precoding matrices for N antenna ports as needed. As a result, memory requirements in the transmitter can be reduced considerably. The embodiments described herein refer mainly to LTE-A systems, but the disclosed techniques are applicable to any other suitable MIMO system.

FIG. 1 is a block diagram that schematically illustrates a transmitter 20 having multiple antennas, in accordance with an embodiment of the present disclosure. The description that follows refers to a transmitter of an LTE-A eNodeB, although other transmitters are contemplated. In alternative embodiments, for example, the methods and systems described herein can be used in transmitters operating in accordance with any other suitable communication standard or protocol, such as IEEE 802.16 (also referred to as WiMAX), for example. Although the description that follows refers mainly to downlink transmission from the eNodeB to the UE, the disclosed methods and systems may be applicable to uplink transmission, as well.

Transmitter 20 comprises one or more modulation chains, each comprising an Error Correction Code (ECC) encoder 24, a scrambler 28 and a modulation mapper 32. Data for transmission is encoded by ECC encoders 24, to produce respective ECC code words. (The example of FIG. 1 shows two separate ECC encoders for clarity. In practice, however, the transmitter may comprise a single ECC encoder that produces code words for the different modulation chains.)

The bits of each code word are scrambled by a respective scrambler 28, and then modulated by a respective modulation mapper 32. Each modulation mapper produces a stream of complex-valued modulated symbols. Any suitable modulation scheme, such as Quadrature Phase Shift Keying (QPSK) or Quadrature Amplitude Modulation (QAM), can be used. A given modulation mapper 32 typically operates on the scrambled bits of a given code word to produce a block of complex-valued modulated symbols.

A layer mapper 36 maps the modulated symbol streams produced by modulation mappers 32 onto one or more spatial layers. (For a given set of time and frequency resources allocated to a certain communication channel, the multiple transmit and receive antennas add another "spatial" dimension to those resources. One of the possibilities to exploit the additional spatial dimension is by increasing the number of independent modulated symbols transmitted per time-frequency resource. The factor of increase, relative to the case of a single transmit antenna and a single receive antenna, is defined as the number of spatial layers.) The spatial layers are also referred to herein as data streams.

The actual number of spatial layers (also referred to as the transmission rank) used by mapper 36 is typically a selectable parameter. The choice of this value may depend, for example, on the channel conditions between transmitter 20 and a given receiver (not shown) to which the transmission is intended. Each spatial layer comprises a stream of complex values, which are to be subsequently transmitted over the MIMO communication channel.

The mapped spatial layers are provided to a precoder 40. Precoder 40 maps the spatial layers onto N Tx transmission channels, corresponding to N Tx antenna ports 52 of the transmitter. In the present example, transmitter 20 comprises an LTE-A transmitter having eight Tx antenna ports, i.e., N=8. (Note that a given antenna port may not necessarily correspond to a single physical antenna, but may correspond to a "virtual antenna" whose transmitted signal is generated—in a manner that the receiver need not necessarily be aware of—as a superposition (a weighted sum) of the signals stemming from a number of physical antennas. Note also that the number of antenna ports may be larger than the number of layers.) Resource mappers 44 allocate resource elements (time-frequency allocations) to the respective transmission channels. The outputs of mappers 44 are processed in the present example by respective Orthogonal Frequency Division Multiplexing (OFDM) generators 48, which produce OFDM signals that are transmitted via antenna ports 52 toward the receiver.

Transmitter 20 comprises a controller 56, which configures and controls the different transmitter elements. In particular, controller 56 comprises precoding control module 60, which produces precoding matrices for use by precoder 40. In a typical implementation, module 60 selects a precoding matrix that matches the current channel conditions between the transmitter and the receiver, and configures precoder 40 with the selected precoding matrix. In particular, the number of columns of the precoding matrix determines the transmission rank (i.e., the actual number of spatial layers). This rank is denoted by r, wherein $r \leq N$. (Typically, the rank is also constrained to be smaller than or equal to the number of receiving antennas at the receiver.)

As noted above, transmitter 20 in the present example comprises eight Tx antenna ports 52. Thus, the precoding matrices used by module 60 for a given rank are 8-by-r matrices. These matrices are referred to herein as 8Tx precoding matrices, for the sake of brevity. In some embodiments, the precoding matrices are selected from a codebook, i.e., from a predefined set of matrices that are agreed upon between the transmitter and receiver. In an embodiment, the transmitter receives from the receiver feedback, which is indicative of the preferable precoding matrix in the codebook. Module 60 may select the appropriate matrix from the codebook based on this feedback. Module 60 may configure precoder 40 with the matrix requested by the receiver as-is, or it may apply additional considerations in selecting the precoding scheme to be used by the transmitter.

In some embodiments, the 8Tx precoding matrices used by module 60 are derived from lower-dimension precoding matrices, in the present example from 2Tx and 4Tx precoding matrices (i.e., from precoding matrices defined for two and four Tx antenna ports, respectively). Several methods for deriving 8Tx precoding matrices from 2Tx and 4Tx precoding matrices are described in detail below.

In some embodiments, the codebook of 8Tx precoding matrices is computed in advance and stored in the transmitter. In alternative embodiments, only the 2Tx and 4Tx precoding matrices are stored in the transmitter, and module 60 computes the 8Tx precoding matrices from these matrices as required. In these embodiments, transmitter 20 comprises a memory 64, which holds the lower-dimension codebooks. In the present example, memory 64 holds a 2Tx codebook 68 defined for two Tx antenna ports and a 4Tx codebook 72 defined for four Tx antenna ports. Module 60 computes precoding matrices for eight antenna ports based on lower-dimension matrices selected from codebooks 68 and 72. The functions of module 60 are explained in detail below.

The transmitter configuration shown in FIG. 1 is a simplified example configuration, which is depicted for the sake of conceptual clarity. In alternative embodiments, any other suitable transmitter configuration can also be used. For example, although the embodiments described herein refer mainly to transmitters having N=8 transmit antenna ports, the methods and systems described herein can be used with any other suitable number of antenna ports. Typically, the number of antenna ports is not a prime number. The lower-dimension codebooks from which the NTx precoding matrices are derived may have any other suitable dimensions smaller than N. In some embodiments, transmitter 20 is part of a base station (e.g., LTE-A eNodeB), and the precoding schemes described herein are applied in the downlink channel. In alternative embodiments, transmitter 20 is part of a mobile terminal (e.g., LTE-A UE), and the precoding schemes described herein are applied in the uplink channel.

The different components of transmitter 20 may be implemented using dedicated hardware, such as using one or more Application-Specific Integrated Circuits (ASICs) and/or Field-Programmable Gate Arrays (FPGAs). Alternatively, some transmitter components may be implemented using software running on general-purpose hardware, or using a combination of hardware and software elements. Typically, controller 56 comprises a general-purpose processor, which is programmed in software to carry out the functions described herein, although it too may be implemented on dedicated hardware. The software may be downloaded to the processor in electronic form, over a network, for example, or it may, alternatively or additionally, be provided and/or stored on tangible media, such as magnetic, optical, or electronic memory. In some embodiments, some or all of the elements of transmitter 20 may be fabricated in a chip-set. Transmitter elements that are not mandatory for explanation of the disclosed techniques, such as various Radio Frequency (RF) elements, have been omitted from FIG. 1 for the sake of clarity.

Embodiments of the present disclosure provide methods and systems suitable for designing and applying precoding codebooks. The disclosed techniques generate codebooks of NTx precoding matrices from codebooks that are defined for smaller numbers of Tx antenna ports. The embodiments described below produce 8Tx codebooks from 2Tx and 4Tx codebooks, however these techniques can be adapted to any other dimensions in a straightforward manner. As noted above, the NTx precoding matrices may be produced a-priori using the disclosed techniques and provided to module 60, or they can be computed by module 60 when needed.

The description that follows uses the following notation: A codebook defined for $N_T$ Tx antenna ports is denoted $CB^{(N_T)}$. Codebook $CB^{(N_T)}$ comprises multiple sub-codebooks (SCBs), each SCB defined for a given rank r (i.e., a given number of spatial layers to be precoded onto the K Tx antenna ports), $r \leq K$. The SCB for a given rank r is denoted $CB_r^{(N_T)}$. In the case of eight Tx antenna ports, codebook $CB^{(8)}$ is thus given by $$CB^{(8)} = \bigcup_{r=1}^{8} CB_r^{(8)}.$$

When designing a codebook of precoding matrices, it is often desirable for the matrices in the codebook to meet certain design guidelines. Example guidelines are described in "Codebook Based Precoding for 8 TX Transmission in LTE-A," 3GPP TSG RAN WG1 document R1-084172, Prague, Czech Republic, Nov. 10-14, 2008, which is incorporated herein by reference. These guidelines define several desirable properties of the codebook, namely unitarity, nestedness, constant modulus and constrained alphabet.

The Unitarity property means that the precoding matrices in the full-rank SCB are unitary, up to a scalar factor. The nestedness property means that for any $r<N_T$, the columns of every precoding matrix in $CB_r^{(N_T)}$ are proportional (up to a column-dependent scaling) to r columns of a certain precoding matrix in the full-rank SCB $CB_{N_T}^{(N_T)}$. A stronger nestedness requirement imposes that for any $r<N_T$, the columns of every precoding matrix in $CB_r^{(N_T)}$ are proportional (up to a column-dependent scaling) to r columns of a certain precoding matrix in the next-higher-rank SCB $CB_{r+1}^{(N_T)}$.

The nestedness property enables reducing the complexity of computations at the receiver when computing the preferred precoding for several ranks (where the precoding options are restricted to belong to the codebook $CB^{N_T}$), as well as fallback to lower ranks using rank adaptation.

The constant modulus property means that all the matrix element in a given precoding matrix are of equal absolute value. The constrained alphabet property means that the matrix elements in the different precoding matrices are restricted to a simple finite alphabet. One possible alphabet is the 8-PSK alphabet, given by $$\forall W \in CB_r^{(N_T)} \qquad \text{Equation 1}$$
$$(r = 1, 2, \ldots, N_T),$$
$$\forall s = 1, 2, \ldots, r,$$
$$\forall t = 1, 2, \ldots, N_T,$$
$$W_{ts} = \frac{e^{j2\pi\alpha_{ts}/8}}{\sqrt{rN_T}},$$
$$\alpha_{ts} = 0, 1, \ldots, 7$$

In other words, the 8-PSK alphabet is given by:

$$\sqrt{rN_T}\, W_{ts} \in \left\{\pm 1, \pm j, \frac{\pm 1 \pm j}{\sqrt{2}}\right\} \qquad \text{Equation 2}$$

An alternative constrained alphabet is the QPSK alphabet, in which each precoding matrix element is restricted to the set $\{\pm 1, \pm j\}$ (up to an overall normalization constant). The use of constrained alphabets simplifies the computations and reduces memory requirements associated with precoding at the transmitter, as well as feedback computations and decoding at the receiver.

In some embodiments, each precoding matrix in the full-rank SCB $CB_8^{(8)}$ is defined as a Kronecker product between a precoding matrix in $CR_2^{(2)}$ and a precoding matrix in $CB_4^{(4)}$. Thus:

$$CB_8^{(8)} \subseteq \qquad \text{Equation 3}$$
$$\{W^{(2)} \otimes W^{(4)} \mid W^{(n)} \in CB_n^{(n)}\} \cup \{W^{(4)} \otimes W^{(2)} \mid W^{(n)} \in CB_n^{(n)}\}$$

wherein $W^{(2)}$ and $W^{(4)}$ denote precoding matrices drawn from $CB_2^{(2)}$ and $CB_4^{(4)}$, respectively, and $\otimes$ denotes a Kronecker product (also referred to as a direct product or a tensor product).

Given an m-by-n matrix A and a p-by-q matrix B, the Kronecker product of these matrices, denoted $C=A \otimes B$, is an m·p-by-n·q matrix whose elements are defined by $c_{\alpha\beta}=a_{ij}b_{kl}$, wherein $\alpha \equiv p(i-1)+k$ and $\beta \equiv q(j-1)+l$. When A comprises a 2-by-2 matrix, for example, $A \otimes B$ is a block matrix having the form:

$$A \otimes B = \begin{bmatrix} a_{11}B & a_{12}B \\ a_{21}B & a_{22}B \end{bmatrix} \qquad \text{Equation 4}$$

FIG. 2 is a diagram showing a precoding matrix defined as a Kronecker product between two lower-dimension precoding matrices, in accordance with an embodiment of the present disclosure. In the example of FIG. 2, A is an n-by-n precoding matrix drawn from the full-rank $CB_n^{(n)}$ SCB, and B is a p-by-p precoding matrix drawn from the full-rank $CB_p^{(p)}$ SCB. The Kronecker product $A \otimes B$ produces an n·p-by-n·p precoding matrix that can be used as part of a full-rank $CB_{np}^{(np)}$ SCB.

From Equation 1 above and the definition of the Kronecker product, it implies that:

$$\forall W \in CB_8^{(8)},$$
$$\exists W^{(2)} \in CB_2^{(2)} \,\&\, \exists W^{(4)} \in CB_4^{(4)} \qquad \text{Equation 5:}$$

such that:

$$W_{ts} = W_{t_1 s_1}^{(2)} W_{t_2 s_2}^{(4)}$$

for $t_1, s_1=1,2$, $t_2, s_2=1,2,3,4$ \qquad Equation 6:

with either $t=4(t_1-1)+t_2$, $s=4(s_1-1)+s_2$, or $t=2(t_2-1)+t_1$, $s=2(s_2-1)+s_1$.

Thus, Equation 3 above defines each precoding matrix in the full-rank SCB $CB_8^{(8)}$ as a Kronecker product between a precoding matrix from $CB_2^{(2)}$ and a precoding matrix from $CB_4^{(4)}$. This full-rank SCB can be used by transmitter 20 to precode eight spatial layers (data streams) onto the eight Tx antenna ports. As) can be appreciated, if both $CB_2^{(2)}$ and $CB_4^{(4)}$ meet the unitarity, constant modulus and constrained alphabet guidelines described above, then this construction automatically guarantees that the full-rank SCB $CB_8^{(8)}$ meets these guidelines, as well.

In some embodiments, the lower-rank SCB $CB_r^{(8)}$ is derived from the full-rank SCB $CB_8^{(8)}$ in order to precode r<8 layers onto the eight Tx antenna ports of transmitter 20. In an example process, 8-r out of the eight columns of a given matrix in $CB_8^{(8)}$ are deleted, to produce an 8-by-r matrix. The matrix is then multiplied by $\sqrt{8/r}$. The resulting matrix can be used as a candidate for inclusion in $CB_r^{(8)}$. This process meets the less-restrictive nestedness property defined above (in which the columns of every precoding matrix in $CB_r^{(N_T)}$ are proportional (up to a column-dependent scaling) to r columns of a certain precoding matrix in the full-rank SCB $CB_{N_T}^{(N_T)}$).

In another example embodiment, one of the columns in a given matrix in $CB_{r+1}^{(8)}$ is deleted, to produce an 8-by-r matrix. The matrix is then multiplied by $\sqrt{(r+1)/r}$. The resulting matrix can be used as a candidate for inclusion in $CB_r^{(8)}$. This process meets the more-restrictive nestedness property defined above (in which the columns of every precoding matrix in $CB_r^{(N_T)}$ are proportional (up to a column-dependent scaling) to r of the columns of a certain precoding matrix in $CB_{r+1}^{(N_T)}$).

When constructing a given SCB, it is typically desirable to avoid including candidate precoding matrices that are effectively equivalent. Two candidate precoding matrices are considered equivalent if they are identical up to a permutation of rows and/or columns, and/or overall or column-dependent scaling. For example, the matrices $$M1 = \frac{1}{2}\begin{bmatrix} j & 1 \\ 1 & j \end{bmatrix}$$

and $$M2 = \frac{1}{2}\begin{bmatrix} 1 & 1 \\ j & -j \end{bmatrix}$$

are equivalent to one another, since M2 can be produced from M1 by swapping the columns of M1 and then multiplying the second column by $-j$. Equivalent precoding matrices merely permute the spatial streams and possibly rotate the modulated symbols in the streams before they are mapped onto the antenna ports. Thus, in some embodiments, a lower-rank SCB $CB_r^{(8)}$ can be produced from the full-rank SCB $CB_8^{(8)}$ by generating candidate precoding matrices, and removing matrices that are equivalent.

In some embodiments, once a given SCB $CB_r^{(8)}$ is produced, one or more of the precoding matrices in the SCB can be deleted in order to reduce the SCB size. This operation is also referred to as diluting (or trimming) the SCBs. Any suitable criteria can be used for diluting the SCBs. For example, the SCBs can be diluted in a manner that best reduces the amount of feedback from the receiver to the transmitter (e.g., the number of bits used for indicating the preferable precoding matrix to the transmitter). In accordance with an embodiment, although not necessarily, the number of matrices in each SCB is set to integer powers of two, so that the utilization of bits in the feedback messages will be optimal. In another example embodiment, a given SCB is reduced in a manner that improves system performance (e.g., average link throughput). The identities of the precoding matrices that best (or worst) contribute to the desired performance can be determined, for example, by attempting to best cover the space of all (unitary) matrices of the relevant dimension. In one embodiment, the SCB can be diluted so as to maximize the minimum distance (with respect to a certain metric, e.g., a chordal metric) among all pairs of matrices in the SCB. For example, a dilution criterion may specify that the distances between precoding matrices in the SCB should exceed a given threshold. In alternative embodiments, the dilution criterion may depend on the communication system performance, as estimated from link-level or system-level simulation. This evaluation may depend on different factors, such as the transmitter and receiver antenna configurations and the type of channels involved. For example, in order to enable efficient beam-forming from a Uniform Linear Array (ULA) of transmit antennas, it may be beneficial to perform the dilution process so as to retain in SCB $CB_1^{(8)}$ eight column vectors that are proportional to the columns of the 8-by-8 DFT matrix, with elements $$W_{ts} = \exp(j\frac{\pi}{4}ts)/8$$

(where $t,s=0,1,\ldots,7$). As yet another example, the SCB can be diluted by removing precoding matrices that cause considerable computational complexity. For example, matrices containing the 8-PSK elements proportional to $\{\pm1\pm j\}$ can be removed, leaving only the simpler QPSK alphabet. Further additionally or alternatively, the SCBs can be diluted in any other suitable manner.

When constructing the full-rank SCB $CB_8^{(8)}$ according to Equation 3 above, the full-rank SCB comprises $2\cdot2\cdot16=64$ precoding matrices. In some embodiments, a larger-size full-rank SCB can be produced by extending $CB_2^{(2)}$ and/or $CB_4^{(4)}$ before producing $CB_8^{(8)}$. The extension should typically meet the constant modulus and constrained alphabet properties described above, but the additional matrices need not necessarily be generated using Kronecker products. For example, the $CB_2^{(2)}$ SCB can be extended by adding one or both of the matrices in the set $$\delta CB_2^{(2)} = \left\{\frac{1}{2}\begin{bmatrix} 1 & 1 \\ \frac{1+j}{\sqrt{2}} & -\frac{1+j}{\sqrt{2}} \end{bmatrix}, \frac{1}{2}\begin{bmatrix} 1 & 1 \\ \frac{1-j}{\sqrt{2}} & -\frac{1-j}{\sqrt{2}} \end{bmatrix}\right\}$$ Equation 7

(or possibly-weighted permutations of these matrices). If the $CB_2^{(2)}$ SCB is extended by these two matrices, the resulting $CB_8^{(8)}$ SCB has 128 precoding matrices.

Additionally or alternatively, the $CB_4^{(4)}$ SCB can be extended with additional unitary 8-PSK 4-by-4 matrices, for example matrices generated by adding Householder transformations with additional 8-PSK unit vectors. Householder-based codebooks are described, for example, in "Codebook Design for E-UTRA MIMO Pre-coding," 3GPP RAN WG1 document R1-062650, Seoul, Korea, Oct. 9-13, 2006, which is incorporated herein by reference. As another example, the $CB_4^{(4)}$ SCB can be extended by adding precoding matrices that are proportional to the 4-by-4 DFT matrix, with elements $$W_{ts} = \exp(j\frac{\pi}{2}ts)/4,$$

and/or its rotated version $$W_{ts} = \exp\left(j\frac{\pi}{2}t\left(s+\frac{1}{2}\right)\right)/4.$$

Some possible extensions of the $CB_2^{(2)}$ SCB do not meet the constant modulus and/or constrained alphabet properties, but may nevertheless be useful (e.g., in some correlated channel scenarios). For example, the 2-by-2 identity matrix $I_2$ can be added to the $CB_2^{(2)}$ SCB. This extension violates the constant modulus property in the resulting $CB_8^{(8)}$ SCB. On the other hand, the resulting $CB_8^{(8)}$ SCB enables reduced computational complexity because its matrices contain a relatively large number of zeros. As another example that violates the constant modulus and/or constrained alphabet properties, the $CB_4^{(4)}$ SCB can be extended with unitary matrices (up to a scaling factor) that are generated from the 0-extended 8-PSK alphabet $$\left\{0, \pm 1, \pm j, \frac{\pm 1 \pm j}{\sqrt{2}}\right\}.$$

Further additionally or alternatively, the $CB_2^{(2)}$ and $CB_4^{(4)}$ SCBs can be extended in any other suitable way before generating the $CB_8^{(8)}$ SCB.

Figure 3:
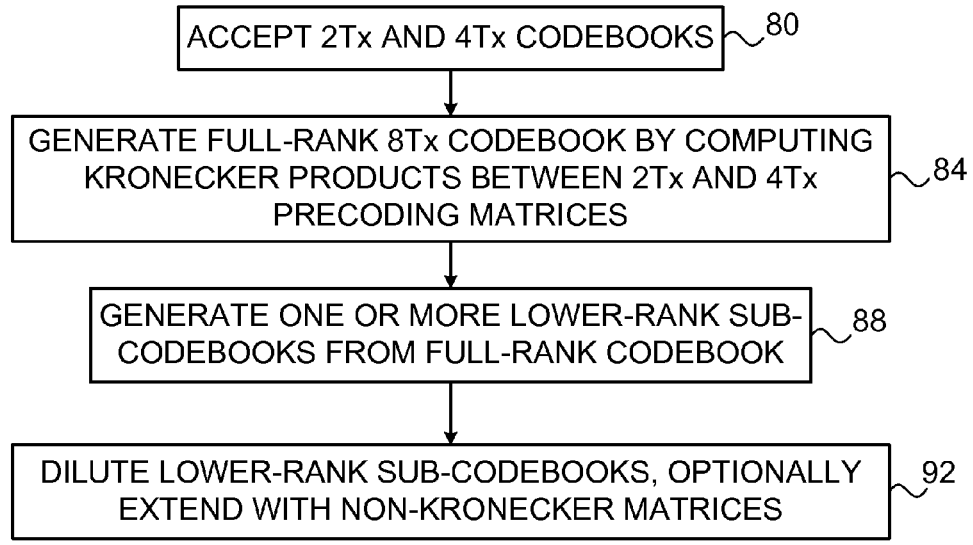
FIG. 3 is a flow chart that schematically illustrates a method for generating precoding codebooks for eight transmit antenna ports using precoding matrices defined for two and four transmit antenna ports, in accordance with an embodiment of the present disclosure.

FIG. 3 is a flow chart that schematically illustrates a method for generating precoding codebooks in accordance with an embodiment of the disclosure. In the example seen, precoding codebooks for eight transmit antenna ports are generated using precoding matrices defined for two and four transmit antenna ports. Generation of precoding codebooks for different numbers of antenna ports using different combinations of precoding matrices, in accordance with an embodiment of the present disclosure, are contemplated. In some embodiments, the method is carried out by module 60 in transmitter 20. In alternative embodiments, the method is carried out in advance, using any suitable computer, and the resulting codebook is provided to transmitter 20.

The method of FIG. 3 begins at an input operation 80, in which the full-rank $CB_2^{(2)}$ and $CB_4^{(4)}$ SCBs are accepted. In the illustrative example, at a full-rank generation operation 84, the full-rank, $CB_8^{(8)}$ SCB is generated from the $CB_2^{(2)}$ and $CB_4^{(4)}$ SCBs, using the process of Equation 3 above. Each precoding matrix in the $CB_8^{(8)}$ SCB is produced by computing a Kronecker product between a matrix selected from the $CB_2^{(2)}$ SCB and a matrix selected from the $CB_4^{(4)}$ SCB.

At a lower-rank generation operation 88, the lower-rank SCBs $CB_r^{(8)}$, are derived from the full-rank SCB $CB_8^{(8)}$. In some embodiments, the resulting SCBs are diluted, at a dilution operation 92. As noted above, the SCBs can be extended with additional matrices that are not necessarily generated using Kronecker products.

Thus, in the example, the output of the method of FIG. 3 is a 8Tx codebook, which comprises SCBs for the different ranks r=1 . . . 8, i.e., $$CB^{(8)} = \bigcup_{r=1}^{8} CB_r^{(8)}.$$

Figure 4:
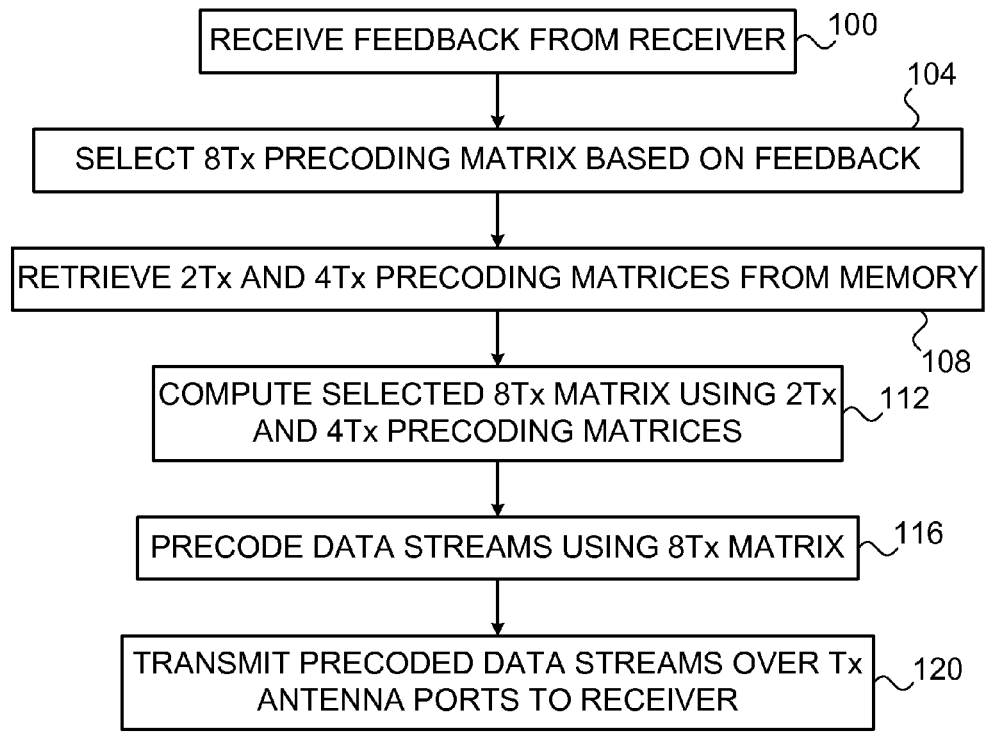
FIG. 4 is a flow chart that schematically illustrates a method for precoding in a transmitter having eight antenna ports using precoding matrices defined for two and four transmit antenna ports, in accordance with an embodiment of the present disclosure.

FIG. 4 is a flow chart that schematically illustrates an example method for precoding in a transmitter having eight antenna ports using precoding matrices defined for two and four transmit antenna ports, in accordance with an embodiment of the present disclosure. The method begins at a feedback operation 100, with transmitter 20 receiving feedback from the receiver. The feedback is indicative of a certain 8Tx precoding matrix in the $CB^{(8)}$ codebook that is suitable for the receiver.

At a selection operation 104, module 60 in the transmitter selects the appropriate precoding matrix based on the feedback. Module 60 then computes this matrix based on 2Tx codebook 68 and 4Tx codebook 72 that are stored in memory 64 (FIG. 1). At a retrieval operation 108, module 60 retrieves the appropriate 2Tx and 4Tx precoding matrices whose Kronecker product will produce the desired 8Tx precoding matrix. At a computation operation 112, module 60 computes the desired 8Tx precoding matrix from the retrieved 2Tx and 4Tx precoding matrices. The computation is based, for example, on Equation 3 above. Module 60 then configures precoder 40 with the resulting 8Tx precoding matrix.

At a precoding operation 116, precoder 40 precodes the r spatial layers for transmission using the selected 8Tx precoding matrix. At a transmission operation 120, transmitter 20 transmits the precoded spatial layers over Tx antenna port 52 to the receiver.

Note that when using the method of FIG. 4, transmitter 20 does not need to store the 8Tx codebook $CB^{(8)}$ in memory, but only the lower-dimension 2Tx and 4Tx codebooks. As a result, memory requirements in the transmitter can be reduced considerably.

In some embodiments, the transmitter does not apply the precoding matrix requested by the receiver as-is. Instead, the transmitter uses the requested matrix along with additional considerations to select a precoding scheme (e.g., precoding matrix) for precoding the downlink transmission. These additional considerations are not necessarily known to the receiver. For example, the precoding scheme may consider the impact or interference caused to other receivers as a result of precoding, and/or the interference caused to the receiver as a result of transmission on the same time-frequency resources to other receivers. Another example is the case of joint transmission from a set of cooperating transmitters to the same receiver, where the precoding employed in each of them is selected in a coordinated manner. In these embodiments, the precoding matrix that is finally applied by the transmitter need not necessarily be selected from a codebook. Thus, the disclosed techniques are also suitable for use in precoding schemes that are not codebook-based.

In the embodiments described herein, the maximum number of spatial layers used by the transmitter is equal to the number of transmit antenna ports—$N_T$. In alternative embodiments, the transmitter may use a maximum number of layers (denoted R1) that is smaller than $N_T$. For example, the transmitter may have eight Tx antenna ports, and may be able to precode up to six spatial layers. In these embodiments, the transmitter may generate only the relevant part of the codebook, in the present example only $$\bigcup_{r=1}^{6} CB_r^{(8)}.$$

Precoding matrices that are produced using Kronecker products suitable, for example, for use in transmitters having cross-polarized antenna configurations. For example, when using eight transmit antennas arranged in a linear array of four cross-polarized pairs, the 2-by-2 precoding matrix in the Kronecker product may be associated with "rotations" in the two-dimensional polarization space, whereas its companion 4-by-4 precoding matrix may be associated with the preferred precoding in any given fixed polarization. In this case, in order to enable efficient beam-forming from this antenna configuration, it may be beneficial to perform the dilution process so as to retain in the lower rank SCBs matrices whose columns are proportional to vectors v of the form $$v \in CB_1^{(2)} \otimes u_s^{(g)}$$
$$\left(\text{where } (u_s^{(g)})_t = \exp\left(j\frac{\pi}{2}t\left(s+\frac{g}{2}\right)\right)\middle/4\ t, s = 0, 1, 2, 3, g = 0, 1\right),$$

namely the Kronecker product of a vector in $CB_1^{(2)}$ by a column of the (rotated) 4-by-4 DFT matrix. (The equation above uses an indexing convention where the antenna elements of one of the linear arrays are numbered 0 . . . 3, and the elements of the second array are numbered 4 . . . 7. Alternatively, any other suitable indexing scheme or convention can also be used. Other indexing conventions may involve reordering of the precoding vector elements, or in general reordering of the rows of the precoding matrices.) Nevertheless, the disclosed techniques are not limited to any particular antenna arrangement and can be used with any suitable antenna configuration. In alternative embodiments, the precoding matrices in the SCB can be selected to match any desired geometrical configuration of the transmit antennas.

Although the embodiments described herein refer mainly to generation of precoding matrices using Kronecker products of two square matrices, the principles of the present invention can be used in any other suitable manner to produce precoding matrices for $N_T$ antenna ports from precoding matrices that are defined for smaller numbers of antenna ports. For example, one may consider generating a precoding matrix W in $CB_r^{(8)}$ by concatenating (i.e., combining the columns of) several matrices $W_k \in CB_{s_k}^{(2)} \otimes CB_{t_k}^{(4)}$ where the relation $$\sum_k s_k t_k = r$$

holds. As another example, one may consider generating a precoding matrix W in $CB_8^{(8)}$ as a triple Kronecker product of the form $W \in CB_2^{(2)} \otimes CB_2^{(2)} \otimes CB_2^{(2)}$.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
configuring a communication system that includes a transmitter and a receiver with a first codebook of first matrices for mapping up to N data streams onto N transmit antenna ports of the transmitter, each of at least some of the first matrices in the first codebook derived from respective second and third matrices selected respectively from a second codebook and a third codebook, wherein the second and third codebooks are configured for mapping data onto respective numbers of transmit antenna ports that are less than N;
mapping the data streams onto the N transmit antenna ports using a scheme based on one of the first matrices; and
transmitting the mapped data streams over the N transmit antenna ports from the transmitter to the receiver,
wherein the first matrices map R1 data streams onto the N antenna ports, R1≤N, wherein configuring the communication system comprises defining a set of the matrices for mapping r data streams onto the N transmit antenna ports, r<R1, each matrix in the set comprising a subset of columns of a given matrix selected from the first matrices, and wherein defining the set comprises including a candidate matrix in the set responsively to verifying that the candidate matrix cannot be expressed as a weighted permutation of the columns of another matrix in the set.

2. The method according to claim 1, wherein configuring the communication system comprises producing a given first matrix by computing a Kronecker product between a respective second matrix selected from the second codebook and a respective third matrix selected from the third codebook.

3. The method according to claim 1, wherein defining the set comprises including a candidate matrix in the set responsively to verifying that respective distances between the candidate matrix and the other matrices in the set, measured in accordance with a given distance metric, exceed a given threshold.

4. The method according to claim 1, wherein defining the set comprises selecting the matrices in the set to match a geometrical configuration of transmit antennas of the transmitter.

5. The method according to claim 4, wherein selecting the matrices in the set comprises choosing the matrices in the set to match an array of cross-polarized transmit antennas.

6. The method according to claim 1, wherein mapping the data streams comprises mapping the r data streams onto the N transmit antenna ports using one of the matrices in the set.

7. The method according to claim 1, wherein configuring the communication system comprises storing in the communication system only the second and third codebooks, and computing the one of the first matrices in the transmitter based on the stored second and third codebooks.

8. The method according to claim 1, wherein transmitting the mapped data streams comprises transmitting a signal conforming to a Long Term Evolution Advanced (LTE-A) specification.

9. The method according to claim 1, wherein mapping the data streams comprises selecting the scheme based on feedback from the receiver.

10. The method according to claim 1, wherein N=8.

11. The method according to claim 10, wherein the second matrices are defined for mapping onto two antenna ports, and wherein the third matrices are defined for mapping onto four antenna ports.

12. The method according to claim 10, wherein the second matrices are defined for mapping onto four antenna ports, and wherein the third matrices are defined for mapping onto two antenna ports.

13. A communication apparatus, comprising:
N transmit antenna ports; and
a transmitter, which is configured to accept a definition of a first codebook of first matrices for mapping up to N data streams onto N transmit antenna ports, each of at least some of the first matrices derived from respective second and third matrices selected respectively from a second codebook and a third codebook, wherein the second and third codebooks are configured for mapping data onto respective numbers of transmit antenna ports that are less than N, to map the data streams onto the N transmit antenna ports using a scheme based on one of the first matrices, and to transmit the mapped data streams over the N transmit antenna ports to a receiver,
wherein the first matrices map R1 data streams onto the N antenna ports, R1=N, and wherein the transmitter is configured to define a set of the matrices for mapping r data streams onto the N transmit antenna ports, r<R1, each matrix in the set comprising a subset of columns of a given matrix selected from the first matrices, and to include a candidate matrix in the set responsively to verifying that the candidate matrix cannot be expressed as a weighted permutation of the columns of another matrix in the set.

14. The apparatus according to claim 13, wherein the transmitter is configured to produce a given first matrix by computing a Kronecker product between a respective second matrix selected from the second codebook and a respective third matrix selected from the third codebook.

15. The apparatus according to claim 13, wherein the transmitter comprises a memory and is configured to store in the memory only the second and third codebooks, and to compute the one of the first matrices based on the stored second and third codebooks.

16. The apparatus according to claim 13, wherein the transmitter is configured to select the scheme based on feedback from the receiver.

17. The apparatus according to claim 13, wherein the transmitter is configured to transmit the mapped data streams in a signal conforming to a Long Term Evolution Advanced (LTE-A) specification.

18. A mobile communication terminal comprising the communication apparatus of claim 13.

19. A chipset for processing signals in a mobile communication terminal, comprising the communication apparatus of claim 13.

* * * * *